United States Patent

Sakurai

[11] 4,119,873
[45] Oct. 10, 1978

[54] DYNAMOELECTRIC MACHINES

[75] Inventor: Fumio Sakurai, Yokohama, Japan

[73] Assignee: Tokyo Shibaura Denki Kabushiki Kaisha, Kawasaki, Japan

[21] Appl. No.: 723,976

[22] Filed: Sep. 16, 1976

Related U.S. Application Data

[63] Continuation of Ser. No. 565,370, Apr. 7, 1975, abandoned.

[30] Foreign Application Priority Data

Apr. 10, 1974 [JP] Japan .............................. 49-40089[U]

[51] Int. Cl.$^2$ .............................................. H02K 9/26
[52] U.S. Cl. ........................................ 310/56; 310/62; 310/227; 310/232; 55/439
[58] Field of Search ...................... 310/60, 56, 58, 59, 310/52, 53, 62, 63, 219, 227, 232, 233, 89, 55; 55/439, 467

[56] References Cited

U.S. PATENT DOCUMENTS

| | | | |
|---|---|---|---|
| 1,719,407 | 7/1929 | Trudeau | 310/227 |
| 1,816,506 | 7/1931 | Wait | 310/56 |
| 1,963,398 | 6/1934 | Blair | 310/56 |
| 2,315,177 | 3/1943 | Zadnik | 310/227 |
| 2,460,752 | 2/1949 | Jacobsen | 310/227 |
| 2,560,784 | 7/1951 | Sears | 310/227 |

FOREIGN PATENT DOCUMENTS 22,907   8/1962   Japan ........................................ 310/56

OTHER PUBLICATIONS

Nema Standard, 6/1972; Part 1, pp. 5-6.

Primary Examiner—R. Skudy
Attorney, Agent, or Firm—Stevens, Davis, Miller & Mosher

[57] ABSTRACT

In a dynamoelectric machine of the type wherein cooling air taken from outside of the machine is circulated through the housing of the machine by means of a fan and a casing containing slip rings is mounted on the outside of the housing, a portion of the cooling air pressurized by the fan is circulated through the casing for cooling the slip rings.

3 Claims, 1 Drawing Figure

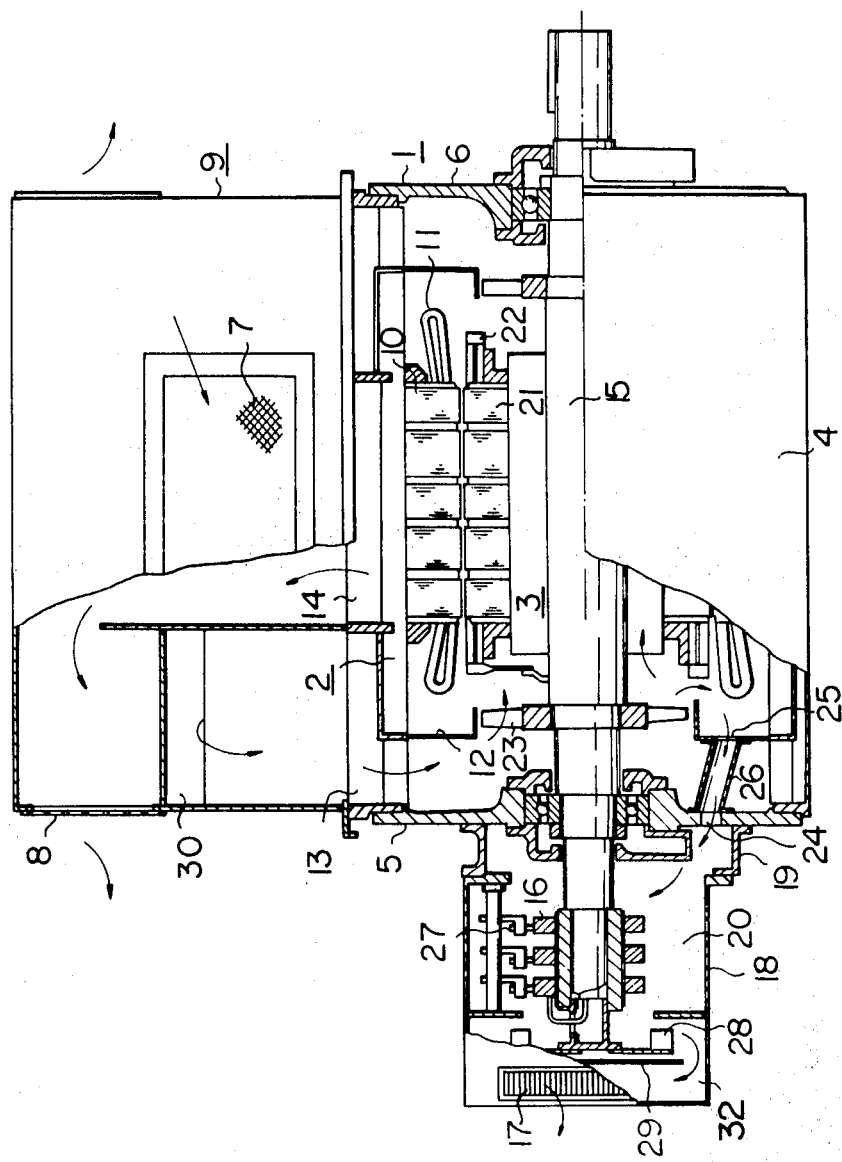

DYNAMOELECTRIC MACHINES

This is a continuation of application Ser. No. 565,370, filed Apr. 7, 1975, now abandoned.

BACKGROUND OF THE INVENTION

This invention relates to a dynamoelectric machine provided with slip rings and more particularly to an open type dynamoelectric machine mainly installed in the outdoors and provided with improved means for circulating cooling air through a chamber containing the slip rings.

In a dynamoelectric machine provided with a slip ring chamber such as a wound rotor induction motor, since the slip ring chamber and the housing of the motor are constructed such that air is independently admitted into and exhausted from the slip ring chamber and the motor housing, for the purpose of preventing foreign matter in the atmospheric air such as rain, snow and dust from entering the machine housing and the slip ring chamber, independent air circulating apparatus are provided for the slip ring chamber and the motor housing, respectively. As a result, the size of the slip ring chamber is increased and its construction becomes complicated.

SUMMARY OF THE INVENTION

It is an object of this invention to provide a dynamoelectric machine including improved means for circulating cooling air through the slip ring chamber.

Another object of this invention is to provide an open type dynamoelectric machine wherein a portion of the cooling air circulated through the housing of the dynamoelectric machine is circulated through the slip ring chamber thereby simplifying the construction of the machine.

According to this invention there is provided a dynamoelectric machine of the type comprising a housing, a stator and rotor contained in the housing, the housing being provided with an inlet opening and a discharge opening for cooling air, a fan mounted on the shaft of the rotor for circulating the cooling air through the inlet opening, the stator and rotor, and the discharge opening, slip rings mounted on the rotor shaft on the outside of the housing and a casing enclosing the slip rings for defining a slip ring chamber, characterized by means for circulating a portion of the cooling air pressurized by the fan through the slip ring chamber.

Suitable air cleaning means are provided near the inlet and discharge openings for preventing foreign matter in the atmospheric air from entering into the dynamoelectric machine.

BRIEF DESCRIPTION OF THE DRAWING

In the accompanying drawing, a single figure shows a longitudinal cross-sectional view of a wound rotor type induction motor embodying the invention.

DESCRIPTION OF THE PREFERRED EMBODIMENTS

Referring now to the accompanying drawing, there is shown a wound rotor type induction motor comprising a main body 1 of the motor including a stator 2 and a rotor 3 rotatably supported in the stator with an air gap therebetween. The stator 2 comprises a cylindrical housing 4, end shields 5 and 6 on the opposite sides of the housing, and a ventilation device 9 mounted on the housing 4. The ventilation device 9 is provided with an inlet opening 7 and a discharge opening 8 for the cooling air. Although not clearly shown in the drawing openings 7 and 8 communicate with the interior of the motor through tortuous air passages 30 for preventing rain, snow, dust, etc. in the atmosphere from entering into the motor. Further, the stator 2 includes a stator core 10, a stator coil 11 mounted in the slots of the stator core and an annular partition wall 12 for partitioning the air passages leading to an air inlet opening 13 and an air discharge opening 14 extending through the housing 4. The rotor 3 comprises a rotary shaft 15 having opposite ends extending through end shields 5 and 6, respectively. Slip rings 16 are mounted on one end of the shaft 15 on the outside of the lefthand end shield 5. The slip rings 16 are housed in a casing 18 which is secured to the outer surface of the end shield 5 through an annular pedestal 19. The casing 18 defines a slip ring chamber 20 therein and is provided with a discharge opening 17 for the cooling air. Brushes 27 cooperating with the slip rings 16 are mounted in the casing 18, and the slip rings 16 are electrically connected to the rotor winding 22 contained in the slots of the rotor core 21. An air circulating fan 23 is secured to the shaft 15 in the central opening of the partition wall 12. The end shield 5 and the partition wall 12 are provided with openings 24 and 25, respectively, which are interconnected by an air duct 26 for supplying a portion of the air pressurized by the fan 23 into the slip ring chamber 20. This air flow is assisted by a fan 28 mounted on the lefthand end of the shaft 15 near the slip rings. Adjacent fan 28 is provided a baffle plate 29 for forming a tortuous air passage 32.

The motor shown in the drawing operates as follows. As the rotor 3 rotates, cooling air is circulated through the motor and the slip ring chamber 20 as shown by arrows by the rotation of fans 23 and 28. More particularly, the cooling air entering into the inlet opening 7 is cleaned while it passes through the tortuous passage 30 and then enters into the stator 2 through inlet opening 13. The air is then pressurized by fan 23 and the major portion of the pressurized air is discharged to the outside through the discharge opening 8 after cooling the cores 10 and 21 and coils 11 and 22 whereas the minor portion of the pressurized air is discharged to the outside through the discharge opening 17 after passing through openings 25 and 24, slip ring chamber 20, fan 28 and tortuous passage 32 thereby cooling the slip rings 16 and the brushes 27, this flow of the cooling air being assisted by fan 28.

As has been described hereinabove, since the cooling air for the slip rings and the brushes is circulated by the fan in the motor housing it is not necessary to provide an additional air inlet opening and a tortuous passage for cleaning the air for the collector chamber 20 thereby simplifying the construction thereof.

Although the invention has been shown and described in terms of a specific embodiment thereof, it should be understood that the invention is not limited to such specific embodiment and that many changes and modifications will be obvious to one skilled in the art. For example, for the purpose of removing foreign matter such as rain, snow and dust contained in the atmospheric air tortuous passages have been provided at the inlet opening and the discharge opening; the same object can be more fully accomplished when any one of many well known cleaning devices such as laminations of felts, metal wire gauges and randomly packed metal chips is located in the tortuous passage. Further, as the quantity of the cooling air circulated through the slip ring chamber 20 is relatively small, the fan 28 provided in the slip ring chamber 20 may be omitted, if desired.

I claim:

1. In a dynamoelectric machine of the type comprising a housing, a stator and rotor contained in said housing, said housing including an inlet opening and a discharge opening for cooling air, tortuous passages between said inlet and discharge openings and in the interior of said housing for preventing foreign matter in atmospheric cooling air from entering into said stator and rotor, a fan mounted on a shaft of the rotor for circulating the cooling air through said inlet opening, said tortuous passages, said stator and rotor and said discharge opening, slip rings mounted on said rotor shaft on the outside of said housing, and a casing enclosing said slip rings and defining a slip ring chamber, the interior of said housing and said slip ring chamber being separated by a portion of said housing defining a first partition wall, the improvement which comprises a second partition wall including an annular portion mounted in said housing to encircle said fan and means for circulating a portion of the cooling air circulated by said fan through another opening in said housing in said first partition wall and into said slip ring chamber, said means for circulating including conduit means defining said another opening and connecting said second partition wall to said slip ring chamber.

2. The dynamoelectric machine according to claim 1 wherein said casing is provided with a discharge opening for discharging the cooling air circulating through said slip ring chamber.

3. The dynamoelectric machine according to claim 2 which further comprises an additional fan mounted on said rotor shaft in said slip ring chamber and means mounted between said additional fan and said discharge opening of said casing for preventing foreign matter from entering into said slip ring chamber.

* * * * *